Stotz & Smith
Tile Machine.

N° 85,490.  Patented Dec. 29, 1868.

Witnesses:

Inventors:

CHRISTIAN STOTZ AND GEORGE SMITH, OF PERTH AMBOY, NEW JERSEY.

Letters Patent No. 85,490, dated December 29, 1868.

CLAY-PIPE MACHINE.

The Schedule referred to in these Letters Patent and making part of the same.

*To all whom it may concern:*

Be it known that we, CHRISTIAN STOTZ and GEORGE SMITH, both of Perth Amboy, in the county of Middlesex, and State of New Jersey, have invented a new and improved Machine for Making Clay Pipes; and we do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 2:
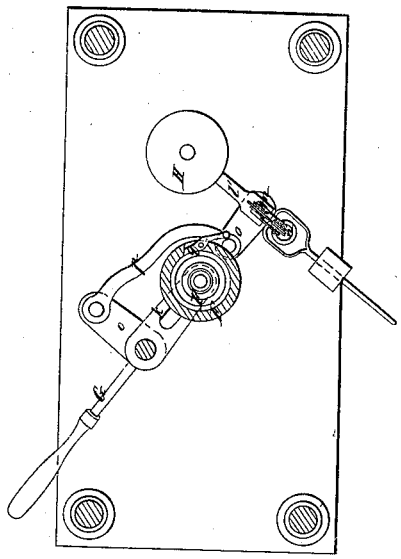
Figure 2 is a horizontal section thereof.
Figure 1:
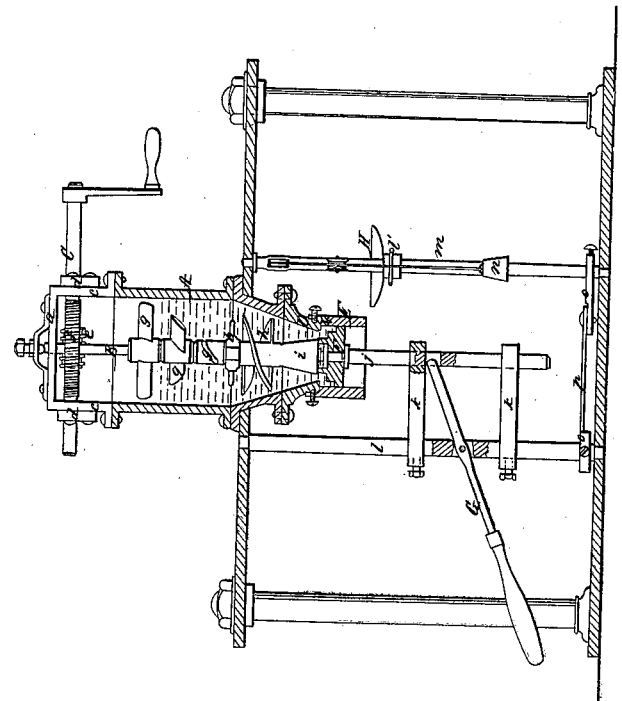
Figure 1 represents a vertical central section of this invention.

This invention consists in the arrangement of a collar-die, to which a rising and falling motion is imparted by a lever, or other suitable mechanism, and which is connected to a swivel-shaft, in combination with the forming-die for the pipes, in such a manner that, by pressing the collar-die up into the forming-die, as the pipe emanates therefrom, the collar on the end of said pipe is formed without interrupting the operation of the machine; and as soon as the collar has been formed, the collar-die is lowered and turned out of the way of the pipe being formed.

The invention consists, further, in the arrangement of a rising and falling platform, which is balanced by a weight and secured to a swivel-shaft that connects with the swivel-shaft of the collar-die in such a manner that, by the act of turning the collar-die off from under the forming-die, the platform is brought under said forming-die, and that by said platform a support is obtained for the pipe emanating from the forming-die, which yields as the length of said pipe increases.

This invention consists, also, in the arrangement of a rotary tubular extension, fitted to the forming-die, and provided with an adjustable knife, in such a manner that, by throwing the knife in and turning said extension, the pipe emanating from the forming-die can be cut to the required length without interrupting the operation of the machine.

The invention consists, further, in the arrangement of a worm and worm-wheel, in combination with the shaft which carries the arms for tempering the clay, and the wings which propel the clay through the forming-die, in such a manner that a slow and powerful motion can be imparted to said shaft, by means of a simple and cheap mechanism.

A represents a cylinder or hopper, in which the clay is tempered.

This cylinder is open on top, and through its centre rises the shaft B, which has its bearing above, in a bridge-piece, $a$, and below, in a bridge-piece, $b$.

The bridge-piece $a$ is supported by two standards, $c$, which are secured to the hopper A, and from said standards extend the arms $d$, which form the bearings for the driving-shaft C.

On this shaft is mounted a worm, $e$, which gears in a worm-wheel, $f$, secured to the upright shaft B, so that a slow and powerful motion can be imparted to this shaft with a simple and cheap mechanism.

On the shaft B is secured a series of arms, $g$, which serve to temper the clay and to force it downwards into the forming-die D, which is fastened to the bottom end of the hopper A.

The upper part of this forming-die is conical, and in this part work the propeller-blades $h$, which are secured to the shaft B, and which serve to force the tempered clay through the forming-die.

The bottom end of the forming-die is cylindrical, and its inside diameter is equal to the outside diameter of the pipes to be formed.

In the interior of the forming-die is situated the cone $i$, which is attached to the lower end of the shaft by a pin catching in a circular groove, or by any other well-known means, so that said shaft can revolve while the cone remains stationary, or *vice versa*, and the diameter of the large or bottom end of this cone is equal to the inside diameter of the pipes to be formed.

To the bottom end of the forming-die is attached the tubular extension E, by a pin catching in a circular groove, or by any other well-known means, in such a manner that it can be revolved independent of the forming-die, and the inside diameter of this rotary extension is equal to the outside diameter of the collars to be formed at the ends of the clay pipes.

These collars are formed by the action of a collar-die, F, which is secured to the top end of a shaft, $j$, to which a rising and falling motion can be imparted by a hand-lever, G, or by any other suitable mechanism.

Said shaft is guided in arms, $k$, which extend from a swivel-shaft, $l$, so that, by turning this swivel-shaft, the collar-die can be brought under the tubular extension E, or away from under said extension, as will be hereinafter more fully explained.

The collar-die itself resembles a cone-pulley with three speeds, the diameter of the smallest speed being equal to the inside diameter of the pipes to be formed, the diameter of the middle speed equal to the inside diameter of the collars to be formed, and that of the largest speed equal to the outside diameter of said collars, and to the inside diameter of the tubular extension E.

As soon as the clay has been forced through the forming-die, so as to produce a pipe of sufficient length for the collar, the collar-die is forced up into the tubular extension, and thereby the collar is formed without interrupting the operation of the machine.

After the collar has thus been formed, the collar-die is lowered and turned off from under the tubular extension E, and the platform H is brought under said extension, so as to support the pipe, as the same emanates from the forming-die.

This platform is secured in the end of an arm, $l'$, which slides up and down on an upright shaft, $m$, and which is so balanced by a weight, $n$, that it is depressed, by a slight pressure on the platform, but as soon as the platform is relieved, said arm will be carried up to such a height that the upper surface of the platform H is on a level with the lower edge of the tubular extension.

The shaft $m$ connects, by arms $o$, and a rod, $p$, with the swivel-shaft $l$, which carries the collar-die, so that, by the action of turning said collar-die under the tubular extension E, the platform H is turned out from under said extension, and *vice versa*, suitable stops being applied to arrest either the collar-die or the platform in the proper position under said extension.

As the pipe increases in length, it bears upon the platform H, and bears the same down automatically, so that said pipe is prevented from being broken by its own weight before the clay has set.

When the pipe has reached the desired length, it is cut off by a knife, $q$, which is secured in the tubular extension E, and which is so arranged that its cutting-edge can be thrown in or out. When the pipe is to be cut, the cutting-edge of the knife is thrown in, and by revolving the tubular extension E, the operation of cutting is effected.

As soon as this operation has been accomplished, the platform H, together with the finished pipe, is turned out from under the extension E, the collar-die is raised, and the collar on the succeeding pipe is formed, without interrupting the operation of the machine.

By these means, the operation of manufacturing clay pipes is materially facilitated, and a large number of such pipes can be produced in a comparatively short time.

Having thus described our invention,

What we claim as new, and desire to secure by Letters Patent, is—

The combination, with the tubular extension-die E, of the adjustable die F, swivel-shaft $l$, arm $o$, rod $p$, and balanced platform H upon its shaft $m$, substantially as and for the purpose set forth.

This specification signed by us, this 21st day of October, 1868.

CHRISTIAN STOTZ.
      GEORGE SMITH.

Witnesses:
 W. HAUFF,
 ERNEST F. KASTENHUBER.